April 28, 1953
M. F. MURRAY
2,636,468
SOUND PRODUCING EMERGENCY BRAKE INDICATING ATTACHMENT FOR VEHICLES
Filed March 14, 1950
2 SHEETS—SHEET 1
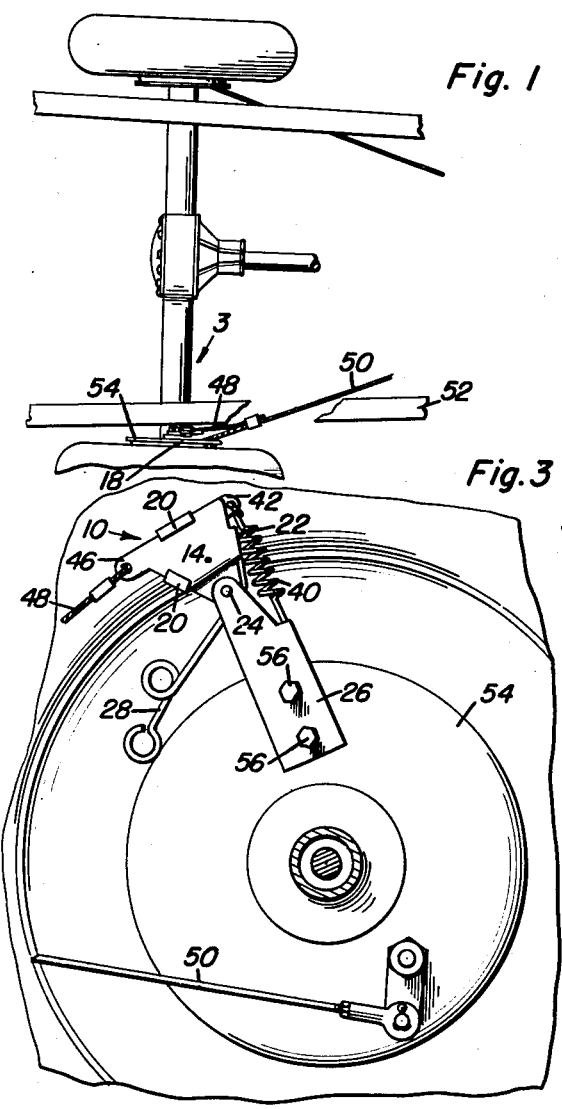
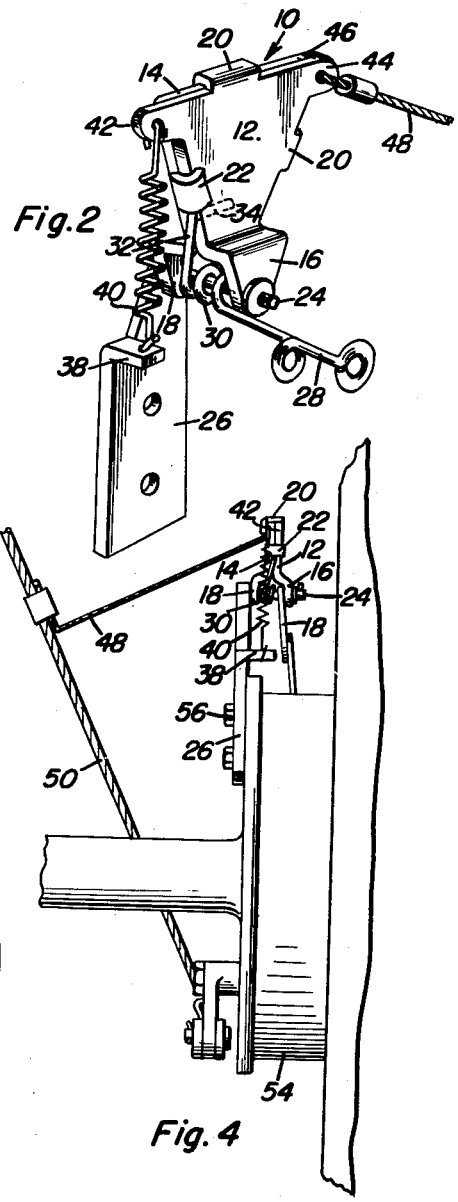
Inventor
Michael F. Murray
By Clarence A. O'Brien
and Harvey B. Jacobson
Attorneys Inventor
Michael F. Murray Patented Apr. 28, 1953

2,636,468

UNITED STATES PATENT OFFICE 2,636,468

SOUND PRODUCING EMERGENCY BRAKE INDICATING ATTACHMENT FOR VEHICLES

Michael F. Murray, Eureka, Calif., assignor of fifty-one per cent to George W. Pierce, Eugene, Oreg.

Application March 14, 1950, Serial No. 149,553

9 Claims. (Cl. 116—56)

This invention relates to new and useful improvements in brake indicating attachments for vehicles and the primary object of the present invention is to provide a noise producing device for indicating when the emergency brake of a vehicle has not been released in order to prevent a driver from operating the vehicle with the emergency brakes set.

Another object of the present invention is to provide a sound producing emergency brake indicating attachment for vehicles that includes a resilient ground contact and dragging member that will effect a sound when the vehicle is moving with its emergency brake set.

A further object of the present invention is to provide a device of the aforementioned character that is quickly and readily mounted upon a part of a vehicle and which is attached to the usual emergency brake operating cable of a vehicle in a convenient, out of the way, position.

A still further aim of the present invention is to provide a sound producing emergency brake indicating attachment for vehicles that is simple and practical in construction, strong and reliable in use, small and compact in structure, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary plan view of a vehicle chassis and showing the present invention applied to a brake drum housing thereof;

Figure 2 is a perspective view of the present invention per se;

Figure 3 is an enlarged elevational view taken substantially in the direction of arrow numbered 3 in Figure 1 and with the rear axle of the vehicle shown in cross-section;

Figure 4 is a plan view of Figure 3;

Figure 5 is an end view of Figure 2 with part of the support removed and with part of the contact element broken away and shown in section;

Figure 6:
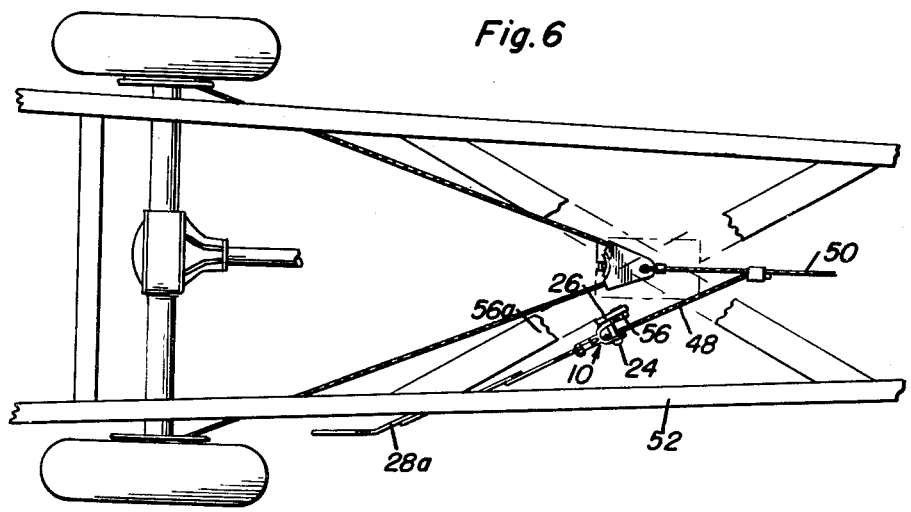
Figure 6 is a fragmentary plan view of a vehicle chassis and showing the present invention in modified form applied thereto.

Referring now to the drawings in detail, wherein for the purpose of illustration, there is disclosed a preferred embodiment of the present invention, the numeral 10 represents a vertically swingable member composed of a pair of plates 12 and 14 having off-set, opposing ears 16 and 18. The plate 12 is provided with holding tongues 20 that embrace the plate 14 to retain the plates in super-imposed relation and the plate 14 is provided with one or more holding tongues 22 for also retaining the plates in super-imposed relation.

The ears 16 and 18 receive a pivot pin 24 that projects laterally from the upper end of a substantially rectangular support or anchor plate 26. A resilient arm or contact element 28 is provided with a coil portion 30 that embraces the pivot pin 24 and an angulated end portion 32 that enters registering grooves 34 and 36 in the inner faces of the plates 12 and 14. The tongues 20 and 22 also retain the end portion 32 clamped between the plates 12 and 14.

One upper corner of the anchor plate 26 is bent down to form an anchor ear 38 that receives the lower hook terminal of a coil spring 40. The upper hook terminal of the spring 40 is anchored to a corner ear 42 forming part of the plate 12.

Further corner ears 44 and 46 project from the plates 12 and 14, and receive one end of a flexible element 48 that is suitably attached to the emergency brake operating cable 50 of a vehicle 52.

In practical use of the present invention as shown in Figures 1–5 inclusive, the anchor plate 26 is secured to a brake drum housing 54 of the vehicle 52 by fasteners 56 and the element 28 overlies the housing 54.

When the cable 50 is moved to release the emergency brake, the spring 40 yieldingly urges the member 10 and consequently the element 28 to their raised position. However, when the cable 50 is moved to apply the emergency brake, the cable or element 48 is pulled to move the member 10 about the pivot 24 and lower the element 28 against the housing 54, so that should the vehicle be moved with the emergency brakes applied, the element 28 will bang against the housing 54 to sound a signal for the driver.

Figure 7:
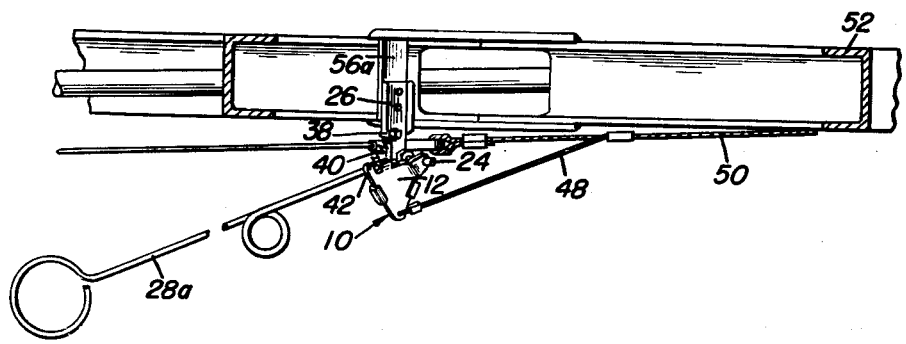
Figure 7 is an enlarged side elevational view of Figure 6.
Figure 8:
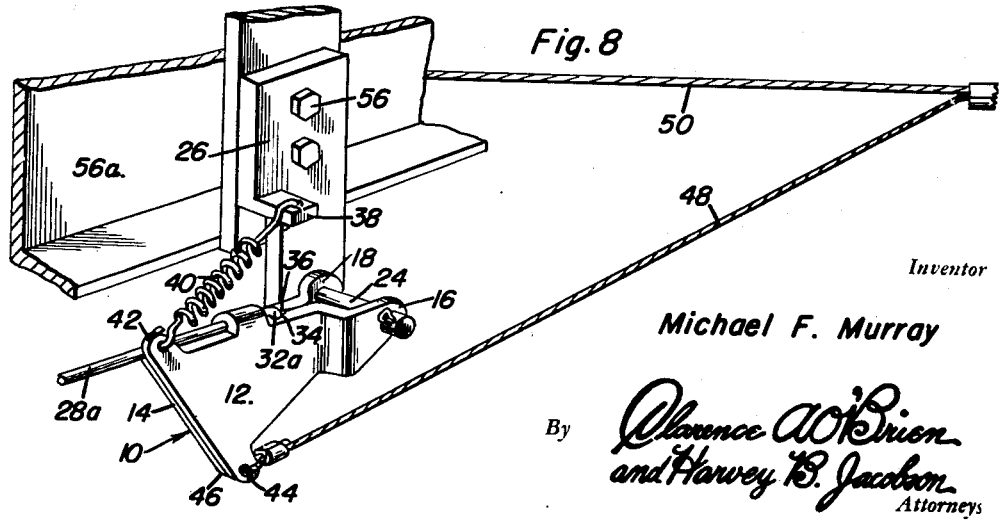
Figure 8 is a fragmentary perspective view showing the method of mounting the device of Figures 6 and 7 on the vehicle chassis.

Attention is now directed to Figures 6, 7 and 8 wherein the present invention is illustrated in slightly modified form, in that the contact element 28 is replaced by a longer contact element 28a having an angulated end 32a received in the grooves 34 and 36 of the plates 12 and 14.

The anchor plate 26 in this construction is inverted and attached by the fasteners 56 to a frame member 56a of the vehicle. The function of the device shown in Figures 6, 7 and 8 is similar to the device previously described since the spring 40 yieldingly urges the member 10 and contact member or element 28a raised, and the member 10 is connected to the emergency brake operating cable 50 by the flexible element 48, so that when the emergency brake is applied the member 10 and element 28a will be lowered. If the vehicle is moved with the emergency brake applied, the element 28a will ride upon the ground to sound an alarm as it bounces up and down. When the emergency brake is released, to relieve tension on the element 48 the spring 40 will raise the element 28a and the member 10.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An emergency brake indicating attachment for a vehicle having an emergency brake operating cable, said attachment comprising a support mountable upon a part of the vehicle, a member pivoted to said support for vertical swinging movement, a surface contacting element carried by said member for engaging a surface to effect a noise when the member is lowered, means yieldingly retaining the member raised, and means attaching the member to the emergency brake operating cable for the lowering of the member and the element upon movement of the emergency brake operating cable to its brake applying position.

2. The combination of claim 1 wherein said member includes a pair of super-imposed plates each having an off-set portion, a pin carried by the off-set portions and pivoting the member to the support, said element being resilient and having a coil portion embracing the pin and an end clamped between said plates.

3. The combination of claim 1 wherein said member includes a pair of super-imposed plates each having an off-set portion, a pin carried by the off-set portions and pivoting the member to the support, said element being resilient and having an end clamped between said plates.

4. In a vehicle having an emergency brake operating cable, an emergency brake indicating attachment for the vehicle comprising a support mountable upon a part of the vehicle, a member pivoted to said support for vertical swinging movement, a surface contacting element carried by said member for engaging a surface to effect a noise when the member is lowered, means yieldingly retaining the member raised, and means for attaching the member to the emergency brake operating cable for the lowering of the member and the element upon movement of the emergency operating cable to a brake applying position, said member including a pair of super-imposed plates, means carried by the plates holding the plates in juxtaposition, said plates having opposed off-set ears, a pivot pin secured to said support and rotatable in said ears, said element having an intermediate coil portion receiving the pin and an end clamped between said plates and held between said plates by said last mentioned means.

5. The combination of claim 1 wherein said first mentioned means includes a coil spring terminally secured to said support and said member.

6. In a vehicle including an emergency brake operating cable, an emergency brake indicating attachment for the vehicle comprising a support mounted on the vehicle, a member pivoted to the support for swinging movement, a surface contacting element carried by said member for engaging a surface to effect a noise as the member is moved in one direction about its pivot, and means attaching the member to the brake operating cable for moving the member and the element toward the surface as the brake operating cable is moved to its brake applying position.

7. In a vehicle including an emergency brake operating cable and a brake drum housing to which the cable extends, a device indicating that the cable is in its brake applying position when movement of the vehicle is initiated with the cable in its brake applying position, said device comprising a bracket secured to the housing, a swingable striker arm pivoted to the bracket and movable selectively against and away from the housing, and means connecting the arm to the cable for movement of the arm into engagement with the housing when the cable is moved to its brake applying position.

8. In a vehicle including an emergency brake operating cable and a brake drum housing to which the cable extends, a device indicating that the cable is in its brake applying position when movement of the vehicle is initiated with the cable in its brake applying position, said device comprising a bracket attached to the vehicle, an arm pivoted to the bracket and movable selectively against and away from a surface on which the vehicle is moving, and means connecting the arm to the cable and moving the arm against the surface as the cable is moved to its brake applying position.

9. A signal attachment for vehicles comprising an anchor member, a pair of superimposed triangular plates, means holding the plates in superimposed relation, each of said plates having an offset corner, said offset corners being in registry with each other, a pin extending through said offset corners and said anchor member, a spring arm having an intermediate coil portion disposed about the pin and an end held between the plates, a spring connecting the plates to the member and restricting movement of the plates on the pin.

MICHAEL F. MURRAY.

References Cited in the file of this patent

UNITED STATES PATENTS

| Number | Name | Date |
|---|---|---|
| 900,427 | Rush | Oct. 6, 1908 |
| 1,232,549 | Hoover | July 10, 1917 |
| 1,623,472 | Gurney | Apr. 5, 1927 |
| 2,361,361 | Sarnes | Oct. 24, 1944 |